(12) United States Patent
Fayfield

(10) Patent No.: US 6,946,643 B1
(45) Date of Patent: Sep. 20, 2005

(54) RETRO-REFLECTIVE PHOTOELECTRIC SENSOR

(75) Inventor: Robert W. Fayfield, Excelsior, MN (US)

(73) Assignee: Banner Engineering Corporation, Minneapolis, MN (US)

( * ) Notice: Subject to any disclaimer, the term of this patent is extended or adjusted under 35 U.S.C. 154(b) by 428 days.

(21) Appl. No.: 10/346,858

(22) Filed: Jan. 17, 2003

(51) Int. Cl.⁷ .............................................. G01V 9/04
(52) U.S. Cl. ................. 250/221; 250/222.1; 356/445
(58) Field of Search ................... 356/445; 250/221, 250/222.1, 237 R

(56) References Cited

U.S. PATENT DOCUMENTS

| | | | |
|---|---|---|---|
| 4,224,608 A | * | 9/1980 | Lederer ..................... 250/221 |
| 4,339,660 A | | 7/1982 | Buchholz et al. |
| 4,546,246 A | * | 10/1985 | Bechtel ..................... 250/221 |
| 4,563,577 A | * | 1/1986 | Schaller ..................... 250/221 |
| 4,580,280 A | * | 4/1986 | Hetrick ....................... 377/6 |
| 4,649,270 A | | 3/1987 | Goldenberg |
| 4,816,667 A | * | 3/1989 | Meinert ..................... 250/221 |
| 5,008,529 A | * | 4/1991 | Nakamura ................. 250/221 |
| 5,187,361 A | * | 2/1993 | Ishii ........................ 250/222.1 |
| 5,324,931 A | * | 6/1994 | Fooks et al. ............... 250/221 |
| 6,166,813 A | | 12/2000 | Roberts |
| 6,384,403 B1 | * | 5/2002 | Guillot et al. ............. 250/226 |

\* cited by examiner

Primary Examiner—Layla Lauchman
Assistant Examiner—Juan D. Valentin, II
(74) Attorney, Agent, or Firm—Merchant & Gould P.C

(57) ABSTRACT

A retroreflective sensor apparatus which includes a light source with a collimating lens and a photoelement with a condensing lens. The light source and the photoelement are positioned adjacent to and offset from each other. A mask is placed between the light source and the collimating lens on a side away from the photoelement to block a portion of the light from the light source from reaching the collimating lens. A method of constructing a retroreflective optical sensor including providing a light source with a collimating lens and a photoelement with a condensing lens. The light source and the photoelement are positioned adjacent to and offset from each other. An opaque mask is placed between the light source and the collimating lens on a side away from the photoelement to block a portion of the light from the light source from reaching the collimating lens. A reflector is positioned to receive light from the light source and reflect it to the photoelement. A retroreflective sensor apparatus in which a mask is placed between the photoelement and the condensing lens on a side away from the light source to block a portion of the light from the light source reflected by the reflector from reaching the photoelement. A method of constructing a retroreflective optical sensor in which a mask is placed between the photoelement and the condensing lens on a side away from the light source to block a portion of the light from the light source reflected by the reflector from reaching the photoelement.

15 Claims, 9 Drawing Sheets

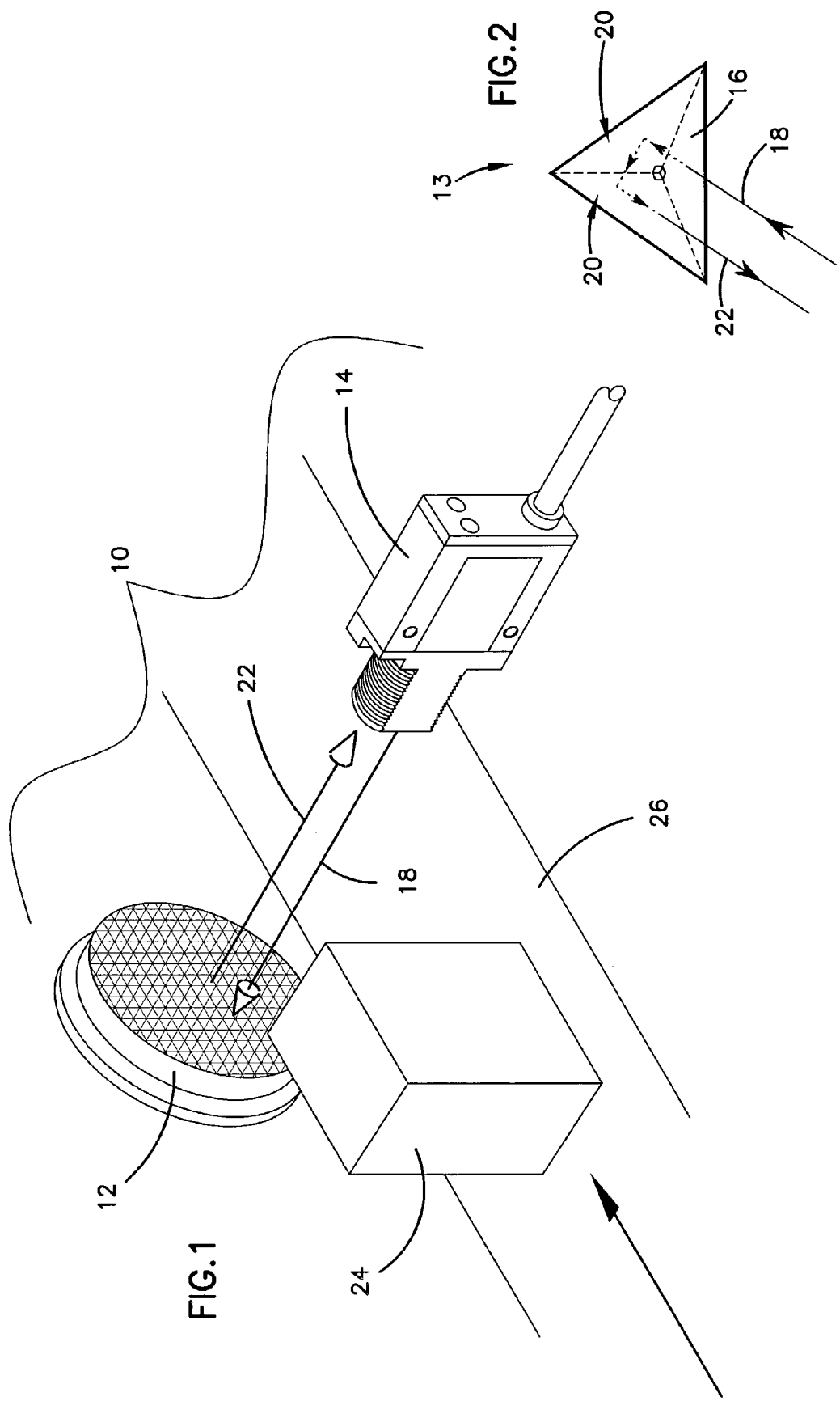

RETRO-REFLECTIVE PHOTOELECTRIC SENSOR

FIELD OF THE INVENTION

The present invention generally relates to photoelectric presence sensing and more specifically relates to retroreflective photoelectric sensing.

BACKGROUND OF THE INVENTION

Retroreflectors are reflectors configured to generally return a light beam to the same location from which the beam emanated. Such reflectors may be used in industrial settings to provide a presence sensing ability. In this sort of application, the reflector is coupled with a light source and a photoelement to form a sensor. The light source projects a beam of light across a path of movement for objects, such as cartons on an assembly or packaging line. The light source and the photoelectric cell are mounted adjacent one another and the reflector on the opposite side of the path of movement. The light source emits light which is received by the reflector and returned across the path to be received by the photoelectric cell. When a carton on the assembly line passes through the light, the light being returned by the reflector to the photoelectric cell is blocked. This interruption of light received by the photoelectric cell signals the position of the carton on the assembly line within the sensor.

The relative brightness or reflectivity of the carton surface may give false readings of the presence or location of an object in the assembly line if the object is positioned close to the photoelectric cell. Improvements to retroreflective photoelectric sensors are desirable.

SUMMARY OF THE INVENTION

The present invention relates to a retroreflective sensor apparatus which includes a light source with a collimating lens and a photoelement with a condensing lens positioned adjacent to and offset from each other. A mask is placed between the light source and the collimating lens on a side away from the photoelement to block a portion of the light from the light source from reaching the collimating lens.

The present invention further relates to a method of constructing a retroreflective optical sensor including providing a light source with a collimating lens and a photoelement with a condensing lens positioned adjacent to and offset from each other. An opaque mask is placed between the light source and the collimating lens on a side away from the photoelement to block a portion of the light from the light source from reaching the collimating lens. A reflector is positioned to receive light from the light source and reflect it to the photoelement.

The present invention further relates to a retroreflective sensor apparatus which includes a light source with a collimating lens and a photoelement with a condensing lens positioned adjacent to and offset from each other. A mask is placed between the photoelement and the codensing lens on a side away from the light source to block a portion of the light from the light source from reaching the photoelement.

The present invention further relates to a method of constructing a retroreflective optical sensor including providing a light source with a collimating lens and a photoelement with a condensing lens positioned adjacent to and offset from each other. A reflector is positioned to receive light from the light source and reflect it to the photoelement. An opaque mask is placed between the photoelement and the condensing lens on a side away from the light source to block a portion of the light from the light source reflected by the reflector from reaching the photoelement through the condensing lens.

BRIEF DESCRIPTION OF THE DRAWINGS

The accompanying drawings, which are incorporated in and constitute a part of the specification, illustrate several aspects of the invention and together with the description, serve to explain the principles of the invention. A brief explanation of the drawings is as follows:

FIG. 1 is a perspective view of a prior art retroreflective photoelectric sensing apparatus.

FIG. 2 is a perspective view of a prior art prism element used in reflector of the retroreflective photoelectric sensing apparatus of FIG. 1.

DETAILED DESCRIPTION OF THE PREFERRED EMBODIMENT

Figure 3:
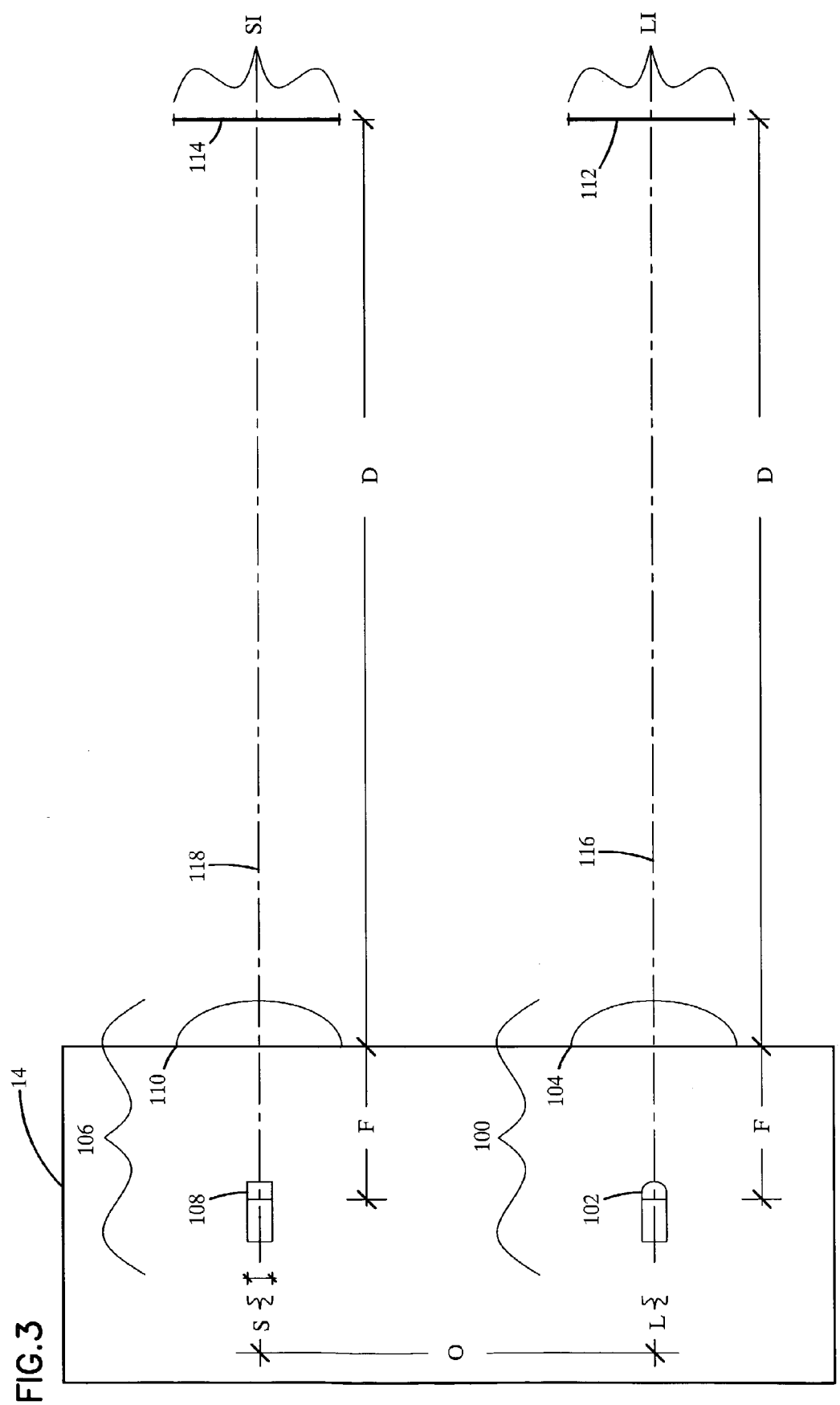
FIG. 3 is a schematic side view of a portion of the sensor of the retroreflective photoelectric sensing apparatus of FIG. 1.

Reference now will be made in detail to exemplary aspects of the present invention that are illustrated in the accompanying drawings. Wherever possible, the same reference numbers will be used throughout the drawings to refer to the same or like parts.

A retroreflective device is a device which reflects light or other radiation back to its source. A device such as retroreflective photoelectric sensor apparatus 10 in FIG. 1 include a sensor 14 including a light source and a photoelectric cell, and a retroreflective reflector 12. Reflector 12 includes a plurality of smaller retroreflective elements 13, such as shown in FIG. 2. Retroreflective element 13 is a small corner cube prism, oriented with a hypotenuse face 16 generally in the direction of the light to be reflected. A ray of incident light 18 from the light source of sensor 14 enters element 13 through hypotenuse face 16 and is reflected off the interior faces 20 of element 13. A ray of return light 22 is reflected back through hypotenuse face 16 parallel to incident light 18, back toward sensor 14.

Retroreflective photoelectric sensor apparatus 10 may be used in an industrial setting to determine the presence or passage of objects on an assembly or production line. Referring back to FIG. 1, object 24 is moving along a conveyor belt 26 between sensor 14 and reflector 12. Before object 24 passes through retro-reflective photoelectric sensor 10, as shown, incident light 18 is being emitted by the light source of sensor 14 and return light 22 is being reflected back to the photocell of sensor 14. The photocell generates an electrical current based on the amount of light it receives. When object 24 is not within retroreflective photoelectric sensor 10, incident light 18 are returned to sensor 14 as return light 22 and the electrical output of the photocell is relatively higher. When object 24 moves between sensor 14 and reflector 12, as shown in FIG. 3, incident light 18 is prevented from reaching reflector 12 and return light 22 is not generated and not received by the photocell of sensor 14. Thus, the electrical output of the photocell is lower, indicating the presence of object 24 on conveyor 26 at the location of retroreflective photoelectric sensor 10.

As described above and shown in FIG. 3, sensor 14 consists of two systems which are mounted adjacent to each other and spaced apart. The first system is a lamp projection system 100 including a light source such as an LED 102 and a collimating lens 104. Lens 104 has a focal length F and is mounted in front of LED 102. LED 102 defines a size L. The second system is a sensor system 106 including a photoelement 108 and a condensing lens 110. Lens 110 also has focal length F and is mounted in front of photoelement 108. Photoelement 108 defines a size S. Lenses 104 and 110 are mounted in front of LED 102 and photoelement 108, respectively, at a distance equal to focal length F.

Thus configured, LED 102 will project light (incident light 18) through lens 104 to form an image 112 at a distance D from lens 104, and image 112 will define a size LI. The ratio of LI with respect to D is equal to the ratio of L with respect to F. Photoelement 108 will receive light (return light 22) through lens 110 from a field of view 114 at distance D, with field of view 114 defining a size SI. The ratio of SI with respect to D is equal to the ratio of S with respect to F.

As shown, a centerline 116 is defined for system 100 and a centerline 118 is defined for system 106. Image 112 is centered about centerline 116 and field of view 114 is centered about centerline 118. Centerlines 116 and 118 are generally parallel to each other and are offset from each other by a distance O. The centers of image 112 and field of view 114 are also offset by distance O. For this discussion, size L of LED 102 and size S of photoelement 108 will be assumed to be equal. SI and LI will also be equal at distance D. Only when LI and SI are greater than offset O will image 112 projected by LED 102 be within field of view 114 and thus visible to photoelement 108.

Figure 4:
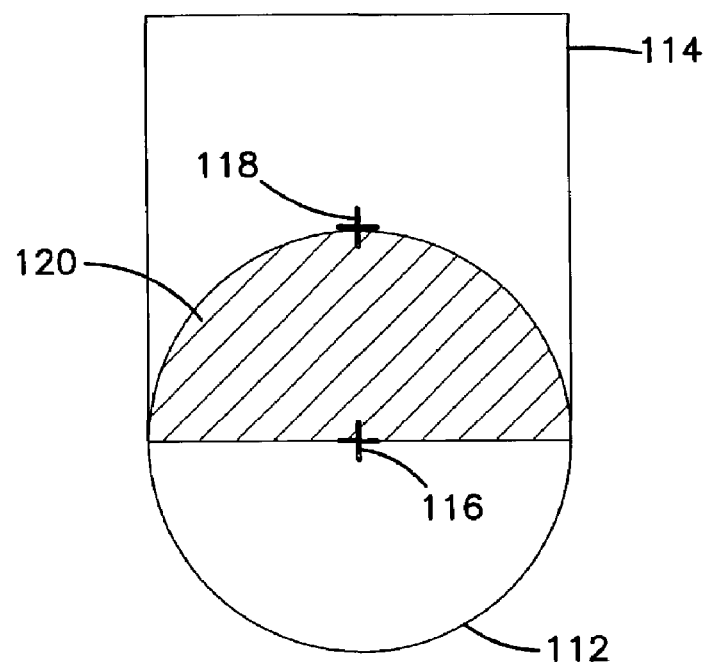
FIG. 4 is a first overlay view of the image of the light projected by the LED and the field of view of the photoelement of the retroreflective photoelectric sensing apparatus of FIG. 1 at, a distance from the sensor.

For example, with lenses 104 and 110 having a focal length of 0.5 inches, photoelement 108 and LED 102 having a size of 0.0625 inches, offset O equal to 0.25 inches, and distance D equal to 4 inches, image 112 and field of view 114 will each have a size of 0.5 inches. Since the SI and LI are greater than O, light projected by LED 102 through lens 104 will be visible to photoelement 108 through lens 110. As shown in FIG. 4, approximately one half of image 112 will be visible to sensor 108, indicated by a coupled light area 120 of the overlap of image 112 and field of view 114. Note that image 112 is circular to correspond to a round LED 102 and field of view 114 is square to correspond to a square photoelement 108. The shapes of image 112 and field of view 114 will reflect the shapes of the light source 102 and photoelement 108, respectively.

Figure 5:
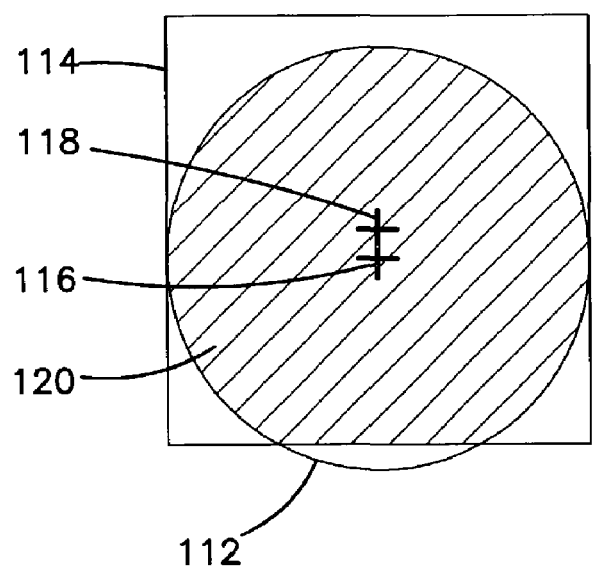
FIG. 5 is a second overlay view of the image of the light projected by the LED and the field of view of the photoelement of the retroreflective photoelectric sensing apparatus of FIG. 1, at a greater distance from the sensor than the overlay of FIG. 4.

FIG. 5 shows the relative size and position of image 112 and field of view 114 when D is equal to 40 inches. With all other values remaining the same, LI and SI of image 112 and field of view 114, respectively, are equal to 5 inches. As offset O remains 0.25 inches, the relative size of coupled light area 120 has increased to encompass nearly all of image 112 and field of view 114. This indicates that nearly all of the light projected by LED 102 through lens 104 will be visible to photoelement 108 through lens 110. At distances D range between 4 inches and 40 inches, coupled light area 120 varies size between the two sizes shown in FIGS. 4 and 5.

Figure 6:
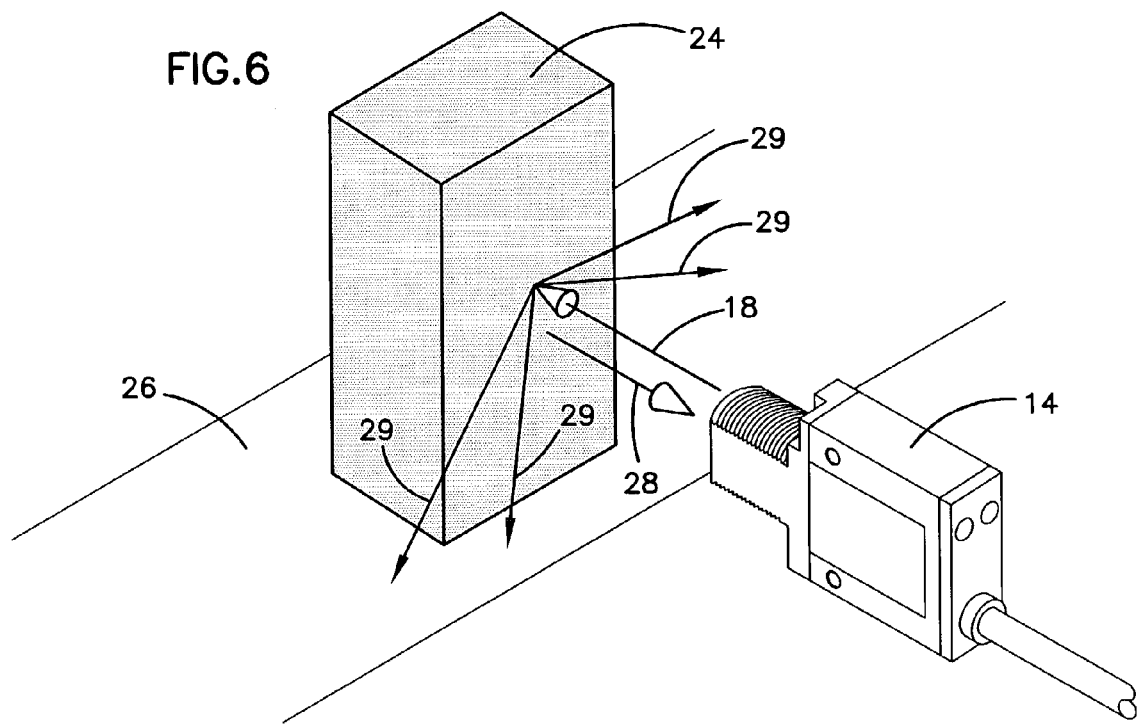
FIG. 6 is a perspective view of the retroreflective photoelectric sensing apparatus of FIG. 1, with an object on positioned between the sensor head and the reflector, reflecting a portion of light back toward the sensor head.

As discussed above, the amount of electrical current generated by photoelement 108 will vary depending on the amount of light received by sensor 108. To permit Retroreflective photoelectric sensor apparatus 10 to distinguish between the presence and absence of object 24 between sensor 14 and reflector 12, some level of electrical current must be set as a threshold. However, if object 24 is sufficiently reflective and object 24 passes close enough to sensor 14, (e.g., in the example above, at a distance of four inches where one half of image 112 is coupled with field of view 114) as shown in FIG. 6, object 24 may reflect some incident light 18 as reflected light 28 back to photoelement 108, while the remaining light is scattered or diffused as diffused light 29. Enough reflected light 28 may be reflected by object 24 to approximate the amount of return light 22 received from reflector 12 when object 24 is not between reflector 12 and sensor 14. Thus, photoelement 108 may generate an electrical current at or above the threshold set to indicate the presence or absence of object 24. Such a situation would generate a false indication that no object 24 was within retroreflective photoelectric sensor apparatus 10. At distances D greater than four inches, even more of the light reflected by object 24 would be coupled field of view 114 of photoelement 108. However, at such distances D, insufficient light 28 will be returned to photoelement 108 to generate the electrical current necessary to signal such a false indication.

Figure 7:
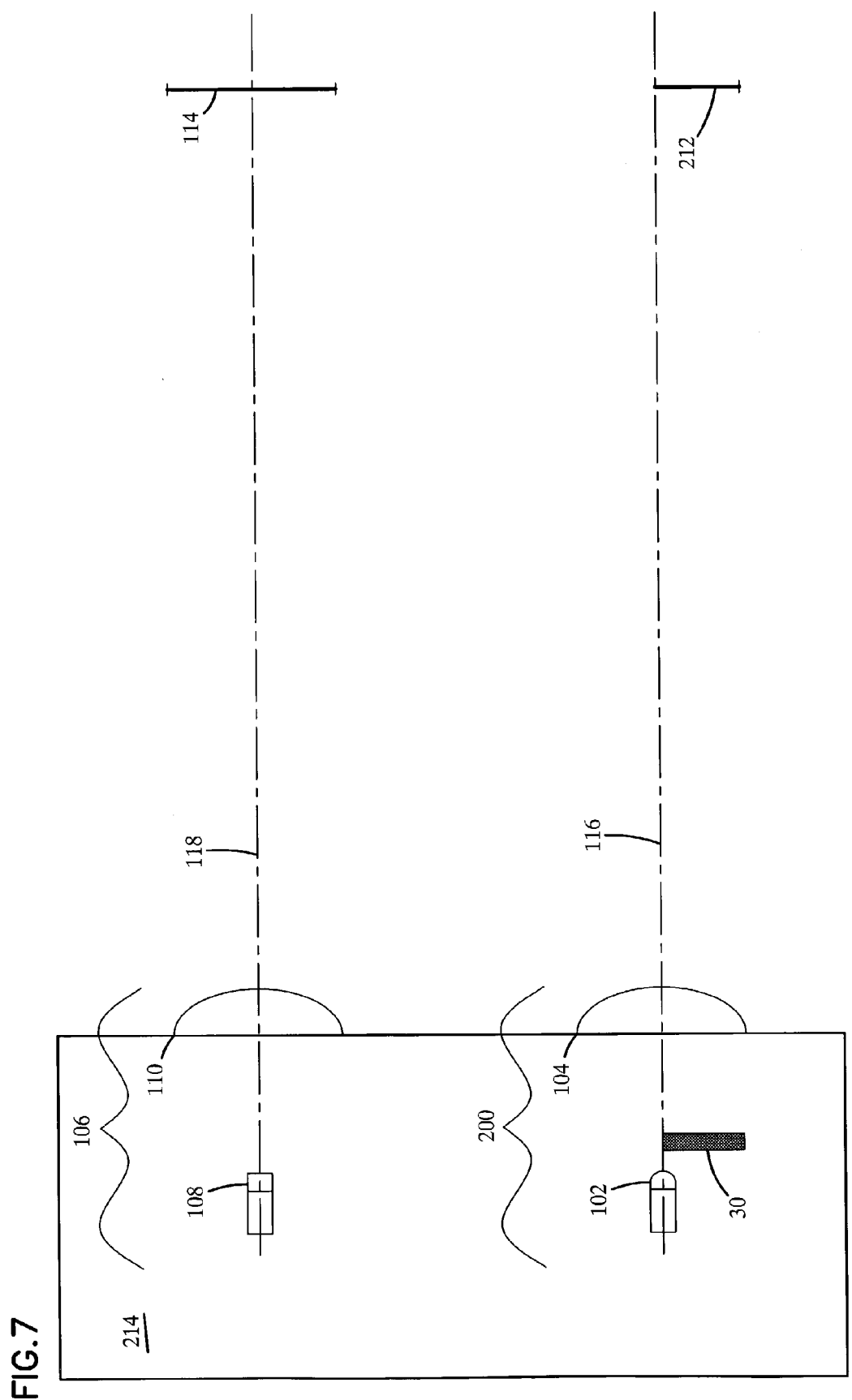
FIG. 7 is a schematic side view of a portion of a sensor according to the present invention, with a mask positioned between the light source and the collimating lens.
Figure 8:
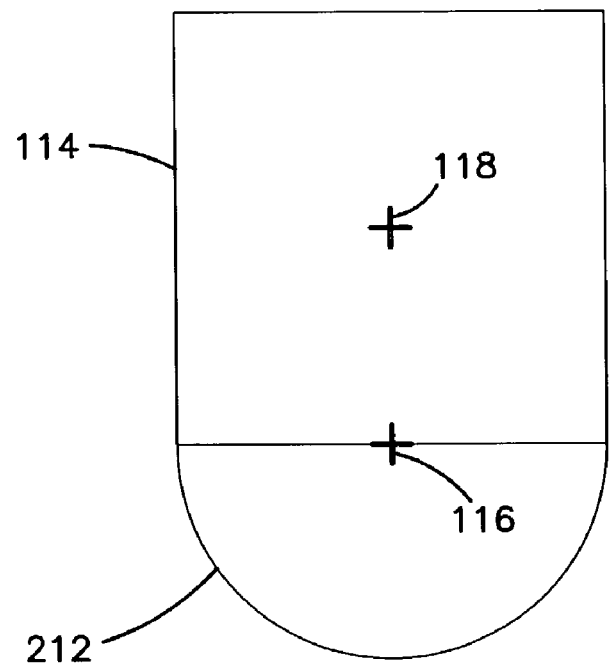
FIG. 8 is an overlay view of the image of the light projected by the LED and the field of view of the photoelement of the sensor of FIG. 7, at the same distance from the sensor as the overlay of FIG. 4.

To reduce or eliminate the amount of coupled area 120 at close ranges where object 24 may return enough light 28 to trigger a false indication, a portion of incident light 18 from LED 102 may be filtered or masked. Referring now to FIG. 7, a mask 30 is inserted between LED 102 and lens 106. As shown, mask 30 occludes approximately one half of the light projecting from LED 102 to lens 106. Collimating lens 106, like all convex lenses, inverts the image of the light passing through the lens. Thus, while mask 30 is positioned away from photoelement 108, a portion 113 of a LI image 212 occluded by mask 30 is actually the portion of toward photoelement 108, as shown in FIG. 8. Photoelement 108 has field of view 114, similar to that illustrated in FIG. 4, above, but image 212 has been reduced to a semicircle which does not overlap field of view 114. There is no coupled area 120 in FIG. 8. Thus, light 28 reflected by object 24 would not be visible to photoelement 108 and no false indication is generated.

Figure 9:
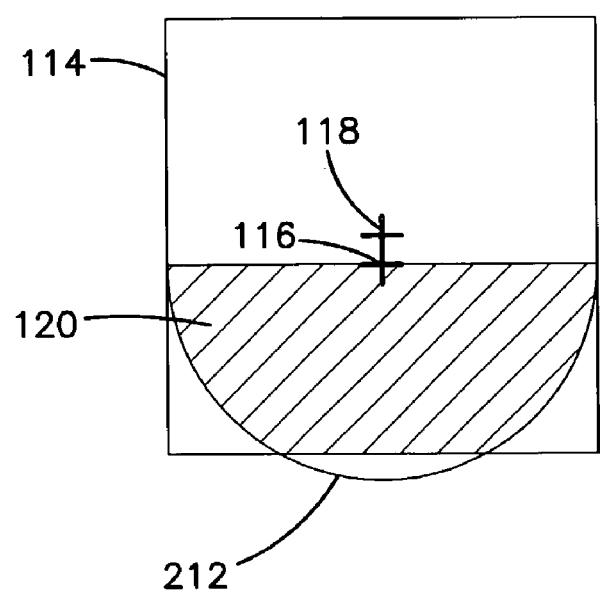
FIG. 9 is an overlay view of the image of the light projected by the LED and the field of view of the photoelement of the sensor of FIG. 7, at the same distance from the sensor as the overlay of FIG. 5.

Referring now to FIG. 9, which corresponds to FIG. 5, image 212 is still a semicircle due to mask 30 but virtually all of image 212 is coupled with field of view 114. Due to the distinct differences between the amount of light received by photoelement 108 from masked LED 102 and thus distinct differences between the electrical current generated by photoelement 108, improved thresholds can be set to permit retroreflective photoelectric sensor apparatus 10 distinguish the presence of object 24 on conveyor 26.

Figure 10:
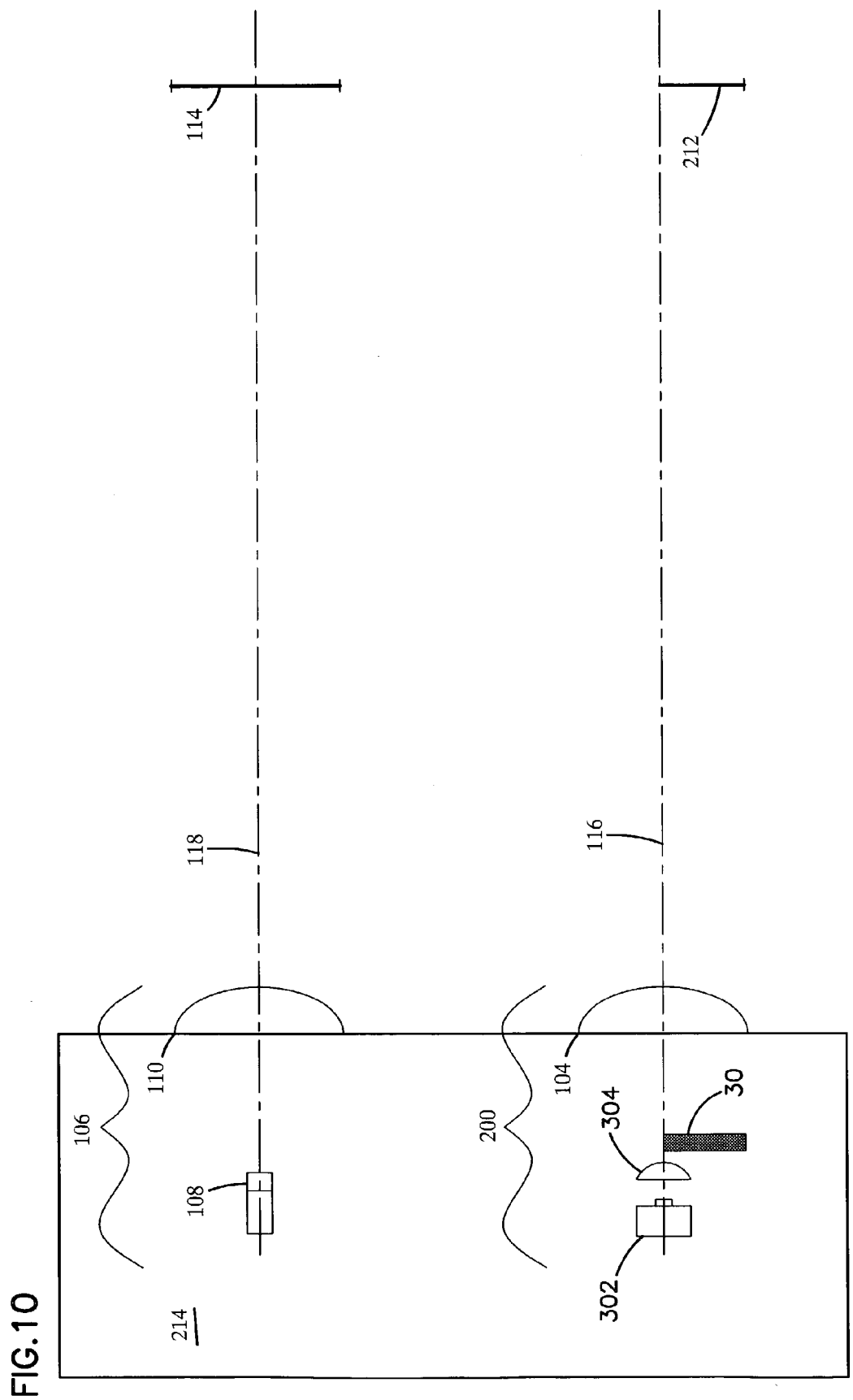
FIG. 10 is a schematic side view of a portion of an alternative embodiment of a sensor according to the present invention, with a secondary lens positioned to magnify the light source and a mask positioned between the secondary lens and the collimating lens.

Referring now to FIG. 10, LED 302 is shown which is smaller in diameter than the size of photoelement 108 mounted to a sensor 314. It is desirable to have the light source effectively the same size as the sensor so that identical lenses can be used to focus and direct the outgoing and incoming light. To increase the effective size of LED 302 to match the size of photoelement 108, a secondary lens 304 is placed between LED 302 and lens 106. Lens 304 is positioned at a distance equal to focal length F of lens 106. Lens 304 receives light from smaller diameter LED 302 and generates an image of LED 302 which is the same effective size as photoelement 108, positioned at the same location as LED 102 in sensor 14, permitting lenses 106 and 110 to be similar is size and focal length, as described above. Mask 30 is positioned between lens 304 and lens 106, so that image 212 is will be unaffected.

Figure 11:
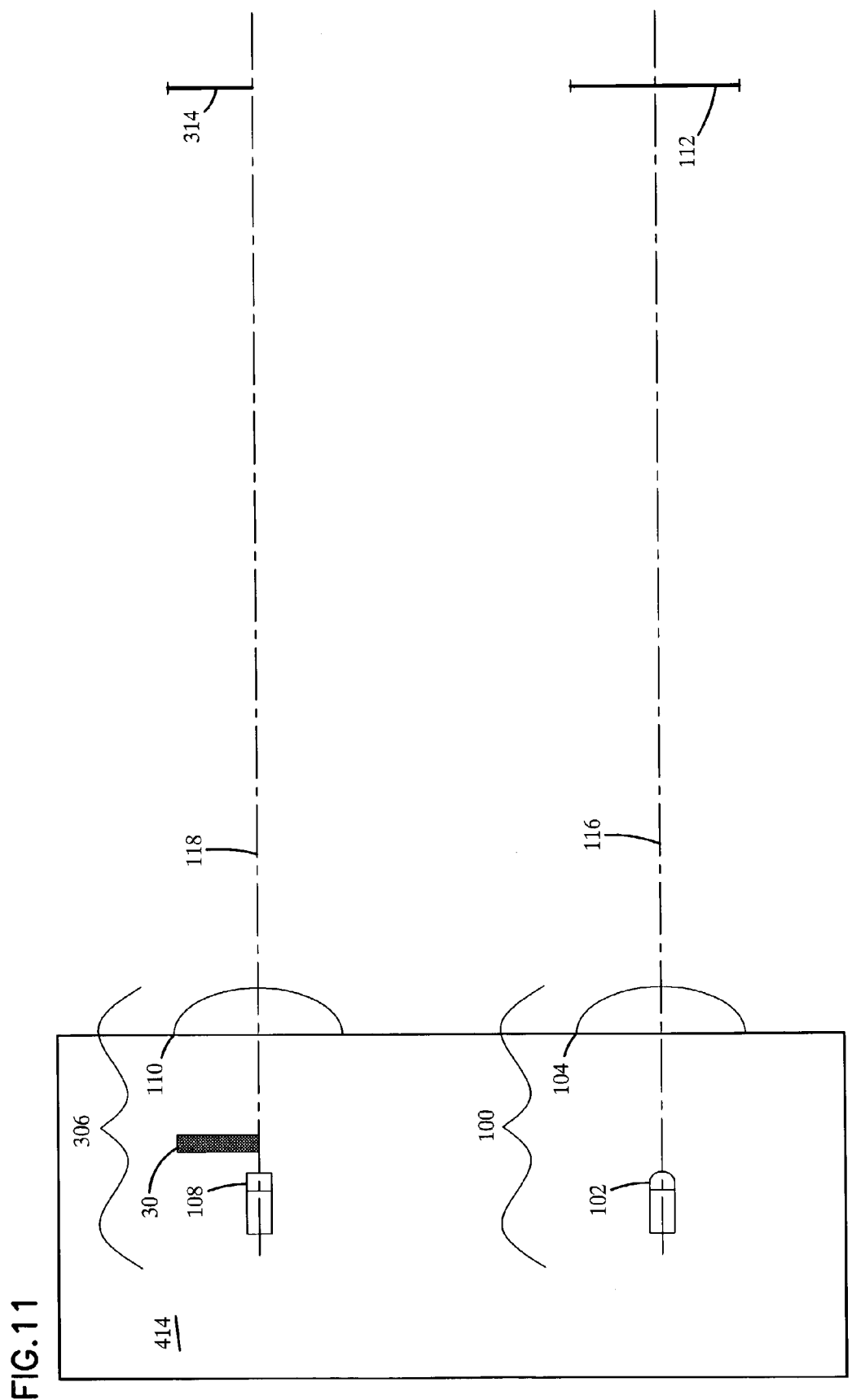
FIG. 11 is a second alternative embodiment of a sensor in accordance with the present invention, with a mask positioned between the photoelement and the condensing lens.
Figure 12:
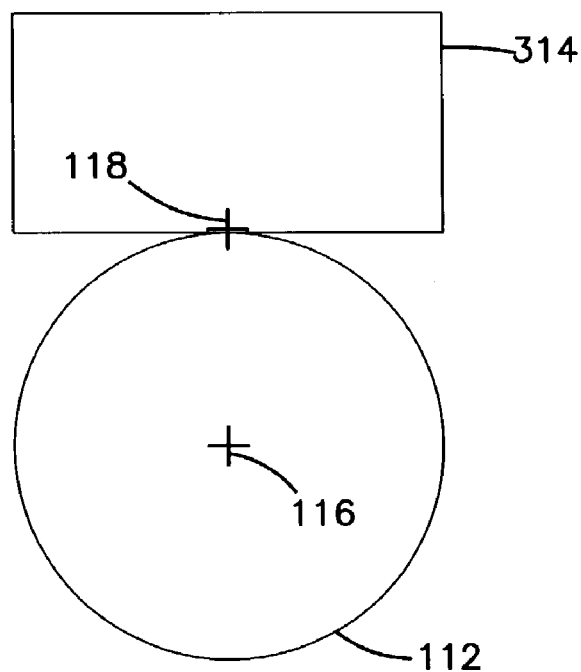
FIG. 12 is an overlay view of the image of the light projected by the LED and the field of view of the photoelement of the sensor of FIG. 11, at the same distance from the sensor as the overlay of FIG. 4.
Figure 13:
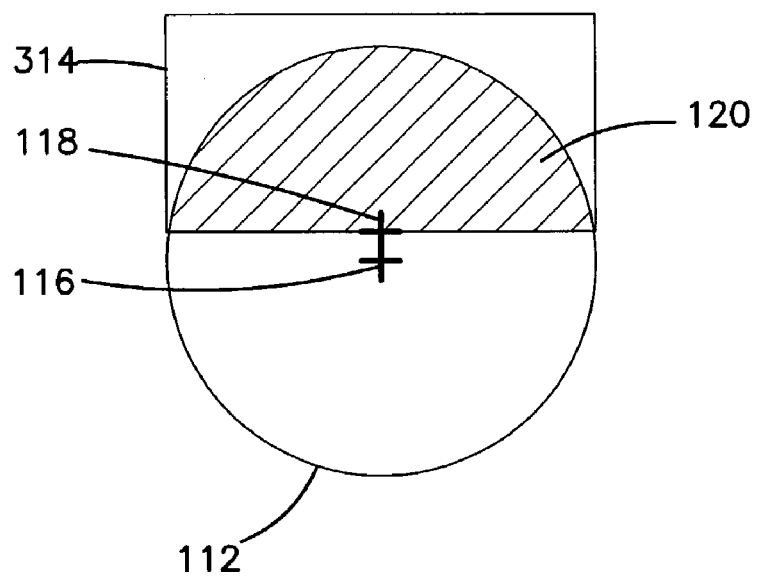
FIG. 13 is an overlay view of the image of the light projected by the LED and the field of view of the photoelement of the sensor of FIG. 11, at the same distance from the sensor as the overlay of FIG. 5.

Alternatively, as shown in FIG. 11, a sensor 414 includes mask 30 positioned between photoelement 108 and lens 110, masking a portion of photoelement 108 positioned away from LED 102. This configuration would project image 112 of LED 102 similar to that shown in FIGS. 4 and 5. However, photoelement 108 would have a reduced field of view 214, as shown in FIGS. 12 and 13. Area 120 of coupled light in this alternative configuration is analogous to that shown in FIGS. 8 and 9.

Retroreflective photoelectric sensor apparatus 10 includes sensor system 106 and light source system 100 mounted to sensor 14. Alternatively, systems 100 and 106 could be housed in separate housings with centerlines 116 and 118 parallel to each other. LED 102 has been used to describe a light source within retroreflective photoelectric sensor apparatus 10. Alternatively, other light emitting sources of similar size and intensity may be used. It is desirable that image 112 and field of view 114 be similar in size and that lenses 104 and 110 are similar in size and shape. Alternatively, if light source 102 is different in size than photoelement 108, lenses 104 and 110 of different size and shape may be used to ensure that image 112 and field of view 114 are similar in size, so that the use of secondary lens 304 is unnecessary.

With regard to the foregoing description, it is to be understood that changes may be made in detail, especially in matters of the construction materials employed and the shape, size and arrangement of the parts without changing the scope of the present invention. It is intended that the specification and depicted aspects be considered exemplary only, with the true scope and spirit of the invention being indicated by the broad meaning of the following claims.

What is claimed is as follows:

1. A retroreflective photoelectric sensor apparatus comprising:
   a light source with a collimating lens positioned in front of the light source, the light source and the collimating lens defining a first centerline;
   a photoelement mounted adjacent to and offset from the light source with a condensing lens positioned in front of the sensor, the photoelement and the condensing lens defining a second centerline generally parallel to the first centerline; and
   a reflector is positioned to reflect light from the light source back to the photoelement;
   wherein the light source defines a first portion closest to the photoelement and a second portion, and a mask is mounted in front of the second portion of the light source, preventing light from the second portion from passing through the collimating lens.

2. The retroreflective photoelectric sensor apparatus of claim 1, wherein the first portion and the second portion are of generally equal size.

3. The retroreflective photoelectric sensor apparatus of claim 1, wherein the light source and the photoelement are similar in size, and the collimating lens and the condensing lens are similar in size and define similar focal lengths.

4. The retroreflective photoelectric sensor apparatus of claim 3, wherein the light source is positioned at a focal point of the collimating lens and the photoelement is positioned at a focal point of the condensing lens.

5. The retroreflective photoelectric sensor apparatus of claim 1, wherein the light source is smaller than the sensor and the collimating lens and the condensing lens are similar in size and define similar focal lengths.

6. The retroreflective photoelectric sensor apparatus of claim 5, wherein a secondary lens is positioned between the light source and the collimating lens, the secondary lens positioned at a focal point of the collimating lens and forming an image of the light source, the image of the light source and the photoelement being generally the same size, and the mask positioned between the secondary lens and the collimating lens.

7. The retroreflective photoelectric sensor apparatus of claim 1, wherein a reflective object placed between lenses and the reflector generally equidistant from the lenses along the centerlines will reflect less light from the light source to the photoelement than the reflector.

8. The retroreflective photoelectric sensor apparatus of claim 7, wherein the reflective object may be positioned so that no light from the light source is reflected to the photoelement.

9. The retroreflective photoelectric sensor apparatus of claim 1, wherein the light source includes a light emitting diode.

10. The retroreflective photoelectric sensor apparatus of claim 1, wherein the reflector includes a plurality of individual reflector prisms configured to generally reflect light from the light source back in the direction of the light source.

11. A method for constructing a retroreflective optical sensor comprising:
   providing a light source and a collimating lens defining a source centerline, and a photoelement and a condensing lens defining a photoelement centerline, the source and photoelement centerlines generally parallel and offset from each other;
   placing an opaque mask between the light source and the collimating lens on a side of the light source away from the photoelement, blocking a portion of the light emitted from the light source from reaching the collimating lens;

positioning a reflector to intersect both the source and photoelement centerlines and reflect light emitted by the light source through the collimating lens back through the condensing lens to the photoelement.

12. The method of claim 11, wherein a reflective object placed between lenses and the reflector generally equidistant from the lenses along the centerlines will reflect less light from the light source to the photoelement than the reflector.

13. The method of claim 12, wherein the reflective object may be positioned so that no light from the light source is reflected to the photoelement.

14. A retroreflective photoelectric sensor apparatus comprising:

a light source with a collimating lens positioned in front of the light source, the light source and the collimating lens defining a first centerline;

a photoelement mounted adjacent to and offset from the light source with a condensing lens positioned in front of the sensor, the photoelement and the condensing lens defining a second centerline generally parallel to the first centerline; and a reflector is positioned to reflect light from the light source back to the photoelement;

wherein the photoelement defines a first portion closest to the light source and a second portion, and a mask is mounted in front of the second portion of the photoelement, preventing light from the light source entering the condensing lens from the collimating lens from reaching the second portion.

15. A method for constructing a retroreflective optical sensor comprising:

providing a light source and a collimating lens defining a source centerline, and a photoelement and a condensing lens defining a photoelement centerline, the source and photoelement centerlines generally parallel and offset from each other;

positioning a reflector to intersect both the source and photoelement centerlines and reflect light emitted by the light source through the collimating lens back through the condensing lens to the photoelement;

placing an opaque mask between the photoelement and the condensing lens on a side of the photoelement away from the light source, so that the mask blocks a portion of the light from the light source entering the condensing lens from the collimating lens from reaching the photoelement.

* * * * *

UNITED STATES PATENT AND TRADEMARK OFFICE
CERTIFICATE OF CORRECTION

PATENT NO. : 6,946,643 B1
DATED : September 20, 2005
INVENTOR(S) : Fayfield

It is certified that error appears in the above-identified patent and that said Letters Patent is hereby corrected as shown below:

Column 2,
Line 24, "FIG. 1 at, a distance" should read -- FIG. 1 at a distance --.
Line 31, "with an object on" should read -- with an object --.

Column 4,
Lines 32-33, "permit Retrore-flective" should read -- permit retrore-flective --.
Line 67, "portion of toward" should read -- portion toward --.

Column 7,
Line 3, "lens;" should read -- lens; and --.

Signed and Sealed this

Twenty-third Day of May, 2006

JON W. DUDAS
*Director of the United States Patent and Trademark Office*